(12) United States Patent
Master (10) Patent No.: US 7,912,232 B2
(45) Date of Patent: Mar. 22, 2011

(54) METHOD AND APPARATUS FOR REMOVING OR ISOLATING VOICE OR INSTRUMENTS ON STEREO RECORDINGS

(76) Inventor: Aaron Master, Mountain View, CA (US)

( * ) Notice: Subject to any disclaimer, the term of this patent is extended or adjusted under 35 U.S.C. 154(b) by 1211 days.

(21) Appl. No.: 11/535,951

(22) Filed: Sep. 27, 2006

(65) Prior Publication Data

US 2007/0076902 A1    Apr. 5, 2007

Related U.S. Application Data

(60) Provisional application No. 60/722,542, filed on Sep. 30, 2005, provisional application No. 60/738,366, filed on Nov. 18, 2005.

(51) Int. Cl.
H04B 15/00    (2006.01)
(52) U.S. Cl. ........................... 381/94.3; 702/190
(58) Field of Classification Search .............. 381/2, 27, 381/61, 63, 74, 300, 306, 309, 310, 303, 381/307, 94.3, 94.7; 704/205, 231, 233, 704/261; 84/616; 702/190
See application file for complete search history.

(56) References Cited

U.S. PATENT DOCUMENTS

| 5,511,128 | A | 4/1996 | Lindemann | |
|---|---|---|---|---|
| 6,405,163 | B1 | 6/2002 | Laroche | |
| 2002/0054685 | A1* | 5/2002 | Avendano et al. | 381/66 |
| 2003/0233227 | A1* | 12/2003 | Rickard et al. | 704/200 |
| 2004/0212320 | A1* | 10/2004 | Dowling et al. | 315/291 |
| 2005/0195995 | A1* | 9/2005 | Baumgarte | 381/104 |
| 2008/0298597 | A1* | 12/2008 | Turku et al. | 381/27 |

OTHER PUBLICATIONS

Ozgur Yilmaz and Scott Rickard, Blind Separation of Speech Mixtures via Time-Frequency Masking, IEEE Transactions on Signal Processing, vol. 52, No. 7, Jul. 2004, p. 1830-1847.*
Juan K. Lin, David G. Grier and Jack D. Cowan, Feature Extracton Approach to Blind Source Separation, IEEE 1997, p. 398-405.*
Nicoleta Roman, DeLiang Wang and Guy J. Brown, Speech segregation based on sound localization, J. Acoust. Soc. Am., vol. 114, No. 4, Pt. 1, Oct. 2003, p. 2236-2252.*
Aoki, et al. Sound Source Segregation Based on Estimating Incident Angle of Each Frequency Component of Input signals Acquired by Multiple Microphones. Acoust. Sci & Tech. 22. 2 (2001).
Araki, et al. Undetermined Blind Separation for Speech in Real Environments with Sparseness and ICA. IEEE. 2004.

(Continued)

*Primary Examiner* — Vivian Chin
*Assistant Examiner* — Friedrich Fahnert
(74) *Attorney, Agent, or Firm* — Michael A. Glenn; Glenn Patent Group (57) ABSTRACT

A first embodiment of the invention provides a method and apparatus for attenuating or amplifying voice or other signals present on a stereo audio recording that uses frequency domain techniques to calculate a time- and frequency-dependent gain factor, based on the input panning and phase information in the recording, and optionally outputs the original recording's phase and/or panning information. A further embodiment of the invention provides a method and apparatus for attenuating or amplifying voice or other signals present on a stereo audio recording that uses training-based frequency domain techniques in each frequency band to calculate a time- and frequency-dependent gain factor, based on the input panning, phase offset, and magnitude information in the recording, and optionally outputs the original recording's phase and/or panning information.

15 Claims, 7 Drawing Sheets

OTHER PUBLICATIONS

Avendano, C. Frequency-Domain Source Identification and Manipulation in Stereo Mixes for enhancement, Suppression and Re-Panning Applications. 2003 IEEE Workshop on Applications of Signal Processing to Audio and Accoustics. Oct. 19-22, 2003. New Paltz, NY.

Blin, et al. A Spareseness-Mixing Matrix Estimation (SMME) Solving the Underdetermined BSS for Convolutive Mixtures. IEEE. 2004.

Gribonval, R. Sparse Decomposition of Stereo Signals with Matching Pursuit and Application to Blind Separation of More than Two Sources from a Stereo Mixture.

Harding, et al. Mask Estimation for Missing Data Speech Recognition Based on Statistics of Binaural Interaction. IEEE Transactions on Audio Speech, and Language Processing. vol. 14. No. 1. Jan. 2006.

Lindemann, E. Two Microphone Nonlinear Frequency Domain Beamformer for Hearing Aid Noise Reduction. WASPAA 1995. New Paltz, NW.

Lin, et al. Feature Extraction Approach to Blind Source Separation.

Master, A. Sound Source Separation of N Sources From Stereo Signals via Fitting to N Models Each Lacking One Source.

Master, A. Bayesian Two Source Modeling for Separation of N Sources from Stereo Signals.

Roman, et al. Speech Segregation Based on Sound Localization. J. Acoust. Soc. Am. 114. Oct. 2001.

Rosca, et al. Generalized Sparse Signal Mixing Model and Application to Noisy Blind Source Separation.

Sawada, et al. Blind Extraction of a Dominant Source Signal from Mixtures of Many Sources. IEEE. 2005.

Vielva, et al. Underdetermined Blind Source Separation in a time-Varying Environment. IEEE. 2002.

Yilmaz, et al. Blind Separation of Speech Mixtures via Time-Frequency Masking.

\* cited by examiner

METHOD AND APPARATUS FOR REMOVING OR ISOLATING VOICE OR INSTRUMENTS ON STEREO RECORDINGS

CROSS REFERENCE TO RELATED APPLICATIONS

This application claims priority to U.S. provisional patent application Ser. Nos. 60/722,542, filed Sep. 30, 2005 and 60/738,366 filed Nov. 18, 2005, each of which is incorporated herein in its entirety by this reference thereto.

BACKGROUND OF THE INVENTION

1. Technical Field

The invention relates to the processing of audio signals. More particularly, the invention relates to a method and apparatus for removing or isolating voice or instruments on stereo recordings, and further relates to a training-based method and apparatus for removing or isolating voice or instruments on stereo recordings.

2. Description of the Prior Art

There are many situations in which we have a stereo recording of many voice or music sources mixed together, but we wish to listen to only one of those sources. In music, we may want to remove the lead vocals to perform karaoke, so that a new singer can seem to sing with the rest of the instruments or voices on the recording. In speech, we may have a recording that contains many independent or quasi-independent voices, and we wish to listen to only one. Separating this one voice out has been called the cocktail party problem.

Existing systems that try to solve these problems suffer from several problems:
  There is much musical noise in the output, which sounds like beeps and tones added to the desired sound.
  Sources that are much louder in one channel than the other are difficult to separate, and may not even be separable.
  Some systems require that sources be independent, i.e. random relative to each other, and they thus perform poorly on music because musicians play together.
  Some systems produce monophonic output, which is perceptually less desirable than stereo output. By producing monophonic output, they discard panning (loudness) and phase (delay) information between channels. Some systems discard both, some discard one, and some discard neither.
  Some systems do not use all of the information between the two stereo channels, preventing them from achieving the best results.

We have several reasons to extract any voice or instrument on a recording. For example, we may then listen to it separately, re-mix or re-pan it on another recording, or analyze it using speech or pitch recognition software.

In the source separation community, the demixing of N sources from two channel (stereo) input is termed underdetermined source separation when N>2.

Underdetermined sound source separation systems perform four steps in general:
  front end processing,
  mixing parameter estimation,
  demixing, and
  front end inversion.

The invention herein disclosed focuses primarily on the demixing stage, which occurs after the mixing parameters are known.

SUMMARY OF THE INVENTION

A first embodiment of the invention provides a method and apparatus for attenuating or amplifying voice or other signals present on a stereo audio recording that uses frequency domain techniques to calculate a time- and frequency-dependent gain factor, based on the input panning and phase information in the recording, and optionally outputs the original recording's phase and/or panning information.

A further embodiment of the invention provides a method and apparatus for attenuating or amplifying voice or other signals present on a stereo audio recording that uses training-based frequency domain techniques to calculate a time- and frequency-dependent gain factor, based on the input panning, phase offset, and magnitude information in the recording, and optionally outputs the original recording's phase and/or panning information

DETAILED DESCRIPTION OF THE INVENTION

A first embodiment of the invention provides a method and apparatus for attenuating or amplifying voice or other signals present on a stereo audio recording that uses frequency domain techniques to calculate a time- and frequency-dependent gain factor, based on the input panning and phase information in the recording, and optionally outputs the original recording's phase and/or panning information.

A further embodiment of the invention provides a method and apparatus for attenuating or amplifying voice or other signals present on a stereo audio recording that uses training-based frequency-band specific frequency domain techniques to calculate a time- and frequency-dependent gain factor, based on the input panning, phase offset, and magnitude information in the recording, and optionally outputs the original recording's phase and/or panning information.

The discussion herein commences with a description of the first embodiment of the invention, as outlined above, and then proceeds with a discussion of the further embodiment. It will be appreciated that, while the invention is discussed herein in connection with stereo audio recordings, that this discussion is for purposes of example only and is not intended to be limiting. Thus, a person skilled in the art will understand that the invention may be practiced with audio other than recorded audio and that the invention may be adapted for use with multi-channel schemes other than stereo.

Attenuating or Amplifying Voice of Other Signals Present on a Stereo Audio Recording A key aspect of the invention is the recognition by the inventor that input data points that appear to be coming from the direction of one source are assigned to that source, with a lesser fraction of the energy assigned as the input data point's direction varies from that of the source. It should be noted that it is not true in 100% of cases that a lesser fraction of the energy assigned as the input data point's direction varies from that of the sources. This is an intuitive way to describe what generally happens in these systems.

Figure 1:
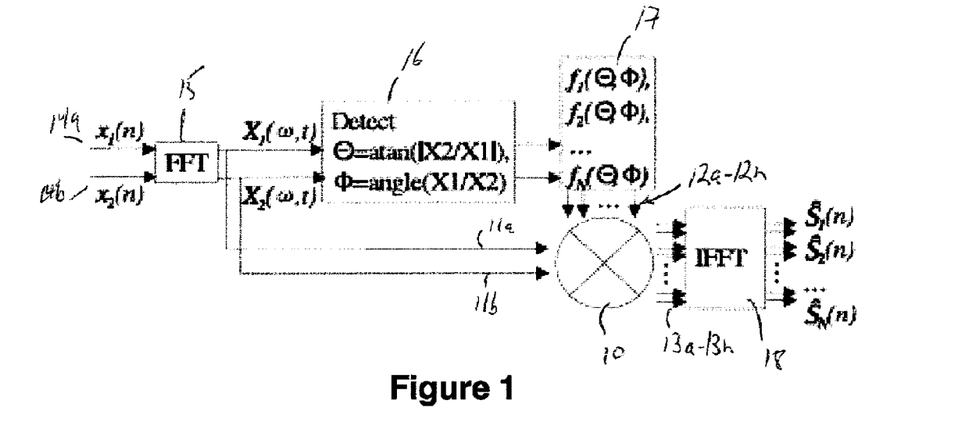
FIG. 1 is a block diagram for a spatial windowing system with N sources according to the invention.

This may be viewed as a nonlinear system that operates as follows (see FIG. 1):

1. Take a stereo audio signal 14a, 14b as input.
2. Perform a complex spectrogram (Short Time Fourier Transform, or STFT) decomposition 15 on each channel, obtaining both the magnitude and phase for each point (frame t and frequency ω). Call the complex-valued left and right channel spectrograms $X_1(\omega, t)$ and $X_2(\omega, t)$, respectively.
3. Estimate (detect 16) the panning parameter $\hat{\Theta} = \arctan(|X_2/X_1|)$ and the phase offset between channels $$\phi = \angle\left(\frac{X_1}{X_2}\right)$$

at each spectrogram point. Using these data, and the fact that we may obtain delay values from phase offset values via $\delta = \phi/\omega$ where ω is the radian frequency of the STFT bin in question, estimate the mixing parameters 17 for all sources by applying any variety of techniques known to those skilled in the art. The mixing parameters may also be specified by the user.
4. Based on the detected $\hat{\Theta}$ and $\phi$ for each spectrogram point and the mixing parameters, assign some fraction of the energy in that spectrogram point to each source i. The illustrations and terminology we provide use $\hat{\Theta}$ and $\phi$, although in implementation it is equally valid to use $\hat{\Theta}$ and $\delta$, with $\delta$ obtained using the relation above.

For each source, assign energy by multiplying the input magnitude STFT representations by a gain factor for each STFT time and frequency, thus creating two new STFT representations, i.e. one for each of the two stereo channels.

5. For each source estimate spectrogram, use either the original input phase, or a special phase function described below. Also, re-pan sources using their original panning data, or make both spectrogram magnitudes the same. Both steps are described below.
6. Now there are two output spectrograms for each source, for a total of 2N.
7. Invert the spectrograms 18 to obtain the final output of N time domain stereo source signal estimates.

Note that the fourth step is a key feature of the novel system, the step that substantially defines the output. It is also the step that has been implemented in very different ways in different systems, and we presently explore it in more depth.

We may use the term "spatial window" to describe the function in step four that assigns a time- and frequency-dependent gain factor. Because the spatial window assigns a fraction of the energy in a spectrogram point to a source based on the panning parameter estimate $\hat{\Theta}$ and phase estimate $\phi$, we may think of it as multiplying the input spectrograms by a masking function which is a function of $\hat{\Theta}$ and $\phi$. There are N sources, each with such a function, so we may notate the window for the $i^{th}$ source as $f_i(\hat{\Theta}, \phi)$. Because this is a function of two variables, and there is one function for each source, we may view the spatial windows for a given system as a set of surfaces over two dimensions. The functions may also vary with frequency, thus creating additional sets of surfaces. In general, it is desirable for $f_i$ to include $\phi$ information because it has been shown that phase information may indicate which sources are sounding most loudly (see, for example, Aaron S. Master, *Stereo Music Source Separation via Bayesian Modeling*. Ph.D. Dissertation, Stanford University (2006) available from http://www-ccrma.stanford.edu/~asmaster/, hereinafter "Master").

A flowchart for a typical spatial windowing system is shown in FIG. 1, where the large multiplication symbol or flowchart summing junction symbol 10 implies multiplying each of the two inputs 11a, 11b on the left by each of the N spatial window function values 12a-12n entering from above, thus generating 2N outputs 13a-13n.

Such stereo spatially windowed output is not the only type of output that may be produced by spatial windowing systems. Other examples include:

Just using the channel in which the targeted source is louder while ignoring the other one (see, for example, Nicoleta Roman, DeLiang Wang, and Guy J. Brown, *Speech segregation based on sound localization*, Journal of the Acoustical Society of America, 114(4):2236-2252 (October 2003), hereinafter "Roman et al");

Combining both output channels into a single source estimate (see, for example, Ozgur Yilmaz and Scott Rickard, *Blind separation of speech mixtures via time-frequency masking*, IEEE Transactions on Signal Processing, 52(7):1830-1847 (July 20043), hereinafter "Yilmaz et al"); or Re-panning the output to be located in the center (see, for example, J-K Lin, D. G. Grier, and J. D. Cowan, *Feature extraction approach to blind source separation*, IEEE Workshop on Neural Networks for Signal Processing (NNSP), pages 398-405, Amelia Island Plantation, Fla., USA (September 1997)).

It is also useful, for purposes of explaining the current system, to think of the input in terms of the following representation, where we use $$U = \sqrt{|X_1|^2 + |X_2|^2}$$

$$X_1 = \sqrt{|X_1|^2 + |X_2|^2}\, e^{j\angle X_1}\cos(\hat{\Theta}) \quad (1)$$

$$= U e^{j\angle X_1}\cos(\hat{\Theta}) \quad (2)$$

$$X_2 = \sqrt{|X_1|^2 + |X_2|^2}\, e^{j(\phi + \angle X_1)}\sin(\hat{\Theta}) \quad (3)$$

$$= U e^{j(\phi + \angle X_1)}\sin(\hat{\Theta}) \quad (4)$$

Figure 2:
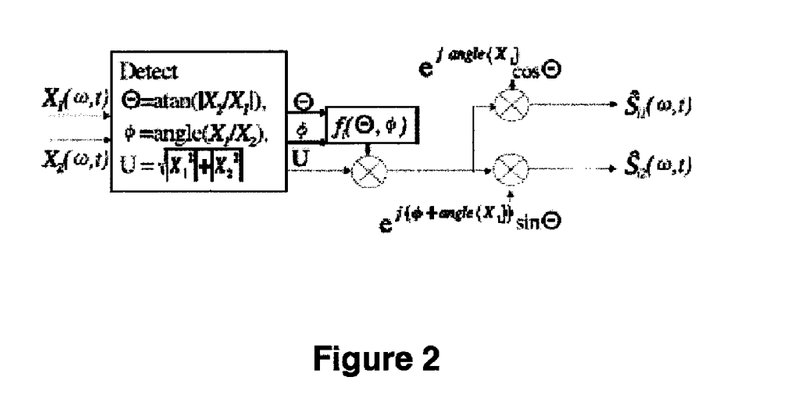
FIG. 2 is a block diagram for a spatial windowing system, showing spatial windowing for source i according to the invention.

We see then, that we represent each spectrogram sample in terms of its power, U, the detected panning parameter $\hat{\Theta}$, the phase in the left channel $\angle X_1$, and the phase offset between channels, $\phi$. Given such a representation, spatial windowing may become more intuitive. The window may be seen as a simple scalar multiple applied to U, based on the values of $\phi$ and $\hat{\Theta}$, with all other information in the input signal preserved. Such an interpretation is shown in FIG. 2, which also considers only one particular spatial window i, instead of N of them. This conceptualization is used in the current system, as we express the output in terms of the $f_i$ for each source multiplied by U.

Source Isolation vs. Elimination

Before proceeding further, we note that thus far we have assumed that the goal of each spatial window $f_i$ in the demixing system is to isolate a source. In other contexts, the goal may be the opposite, i.e. to suppress a source. It is possible to make a trivial conversion from an isolation mask to an elimination mask, and vice versa, by taking (elimination mask)=1−(isolation mask)

or, more formally, $f_{elimination}(\phi,\hat{\Theta})=1-f_{isolation}(\phi,\hat{\Theta})$ after normalizing the elimination mask to make its maximum value unity. We observe this technique in, for example, Jean Laroche, *Process for removing voice from stereo recordings* (June 2002); and Carlos Avendano, *Frequency domain source identification and manipulation in stereo mixes for enhancement, suppression, and re-panning applications*, IEEE ASSP Workshop on the Applications of Signal Processing to Audio and Acoustics, pages 55-58, New Paltz, N.Y., USA (October 2003).

This approach may, however, lead to undesired results. This is because a source isolation system might err on the side of including too few data points to prevent crosstalk errors from other sources. A source elimination system, on the other hand, might err on the side of eliminating too many data points, to be sure that no part of the eliminated source is audible. A system that aims to separate all sources equally well does not have the luxury of erring on one side or the other.

One other option in converting source elimination masks to isolation masks is to add up all the elimination masks for all sources except the target source. Then, applying this sum mask would leave behind only the target source. We use a variation on this approach in addition to other approaches below.

DESCRIPTION OF THE SPECIFIC EMBODIMENTS

We now describe the method for obtaining the time- and frequency-dependent gain factors used in the system, and for obtaining the output phase and panning values. We begin the discussion by describing how to choose gain factors to eliminate a source, and next describe the output phase and panning options. We then describe additional functions that produce other gain factors.

To establish the basis for the presently preferred embodiment, we assume that the sources are mixed using delay and scale parameters. This means that each source is scaled, i.e. made louder in one channel than the other, or the same in both channels, and delayed, i.e. sounds earlier in one channel than the other, or at the same time. Even if this assumption does not fully hold, as in the case of reverberation, the system still functions because the assumption approximately holds. Recalling the DFT pair $\delta(n-n_0) \rightleftharpoons \exp(-j\omega n_0)$, we may write such mixing as:

$$X_1 = \cos(\Theta_1)S_1 + \cos(\Theta_2)S_2 + \ldots + \cos(\Theta_N)S_N$$

$$X_2 = \sin(\Theta_1)S_1 e^{-j\omega\delta_1} + \sin(\Theta_2)S_2 e^{-j\omega\delta_2} + \ldots + \sin(\Theta_N) S_N e^{-j\omega\delta_N} \quad (5)$$

where $\Theta_i$ is the panning parameter for source i, with full left being 0 and full right being $\pi/2$, and $\delta_i$ is the delay parameter for source i. If a source is not panned using delay information, then its corresponding $\delta_i$ is zero. Now, we may eliminate a source in DTFT space by a normalized weighted and delayed subtraction process. We use a system with output $Y_n$:

$$Y_n(\omega,t) = \sin(\Theta_i)X_1(\omega,t) - \cos(\Theta_i)e^{+j\omega\delta_i}X_2(\omega,t). \quad (6)$$

It may be shown using trigonometry that this is $$Y_n(\omega,t) = \frac{\sqrt{|X_1|^2+X_2|^2}}{\sqrt{\sin^2(\Theta+\Theta_i)-0.5\sin(2\Theta)\sin(2\Theta_i)(1+\cos(\phi-\omega\delta_i))}}. \quad (7)$$

Recalling our conceptualization of spatial windowing in FIG. 2, where the output $Y_n$ should be expressed as a fraction of the input magnitude U, this leads to:

$$f_i(\hat{\Theta},\phi) = \frac{1}{\sqrt{\sin^2(\Theta+\Theta_i)-0.5\sin(2\Theta)\sin(2\Theta_i)(1+\cos(\phi-\omega\delta_i))}}. \quad (8)$$

Now that we have this basic function for eliminating a source, we may apply it in a variety of ways. We discuss this below. We still use $Y_n$ to refer to normalized weighted subtraction.

Output Phase for Weighted Subtraction

We presently consider the phase of the two output channels. In other sound source separation systems, the output phase for each of the two channels is copied from the inputs. This is indeed an option. Another option is to choose the phase corresponding to the phase when we eliminate a particular source using a normalized weighted subtraction obtained in $Y_n$. This may be desirable because it makes the corresponding source perceptually less noticeable in the output. The phase is expressed simply as:

$$\angle_{out} = \angle(\sin(\Theta_i)X_1(\omega,t) - \cos(\Theta_i)e^{+j\omega\delta_i}X_2(\omega,t)) \quad (9)$$

Figure 3:
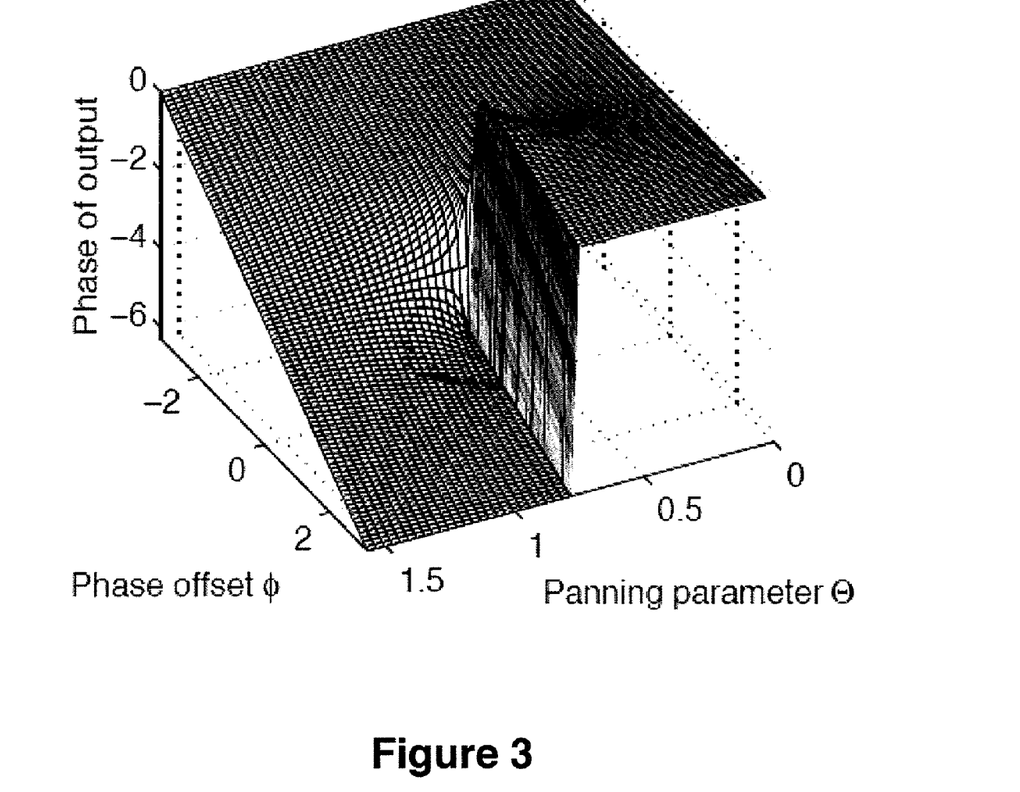
FIG. 3 shows the output phase for a weighted subtraction system when $\Theta_i = \pi/4$ according to the invention.

Imitating the $f_i$ plots above, we plot this as a function of $\Theta$ and $\phi$ in FIG. 3, for the case when $\Theta_i = \pi/4$.

We again note that the preceding mathematical setup and earlier conceptualization of spatial windowing in FIG. 2 allows us to use this or other phases in a system of our own design because we have separated the output magnitude $f_i$ from the output phase. We allow both types of phase to be used in the current system.

Applying Phase, Panning, and $f_i$ Options Independently

We now see that we have three areas in which to choose options for the current system:

$f_i$;

output phase; and output panning.

These may be used independently, as shown in FIG. 2. We now describe several $f_i$ options allowed by the current system.

A system which uses $f_{final} = (f_i)^p$, where the power p is any real number, chosen to create more attenuation of the source. This $f_{final}$ value may be used in all further options below.

Figure 4:
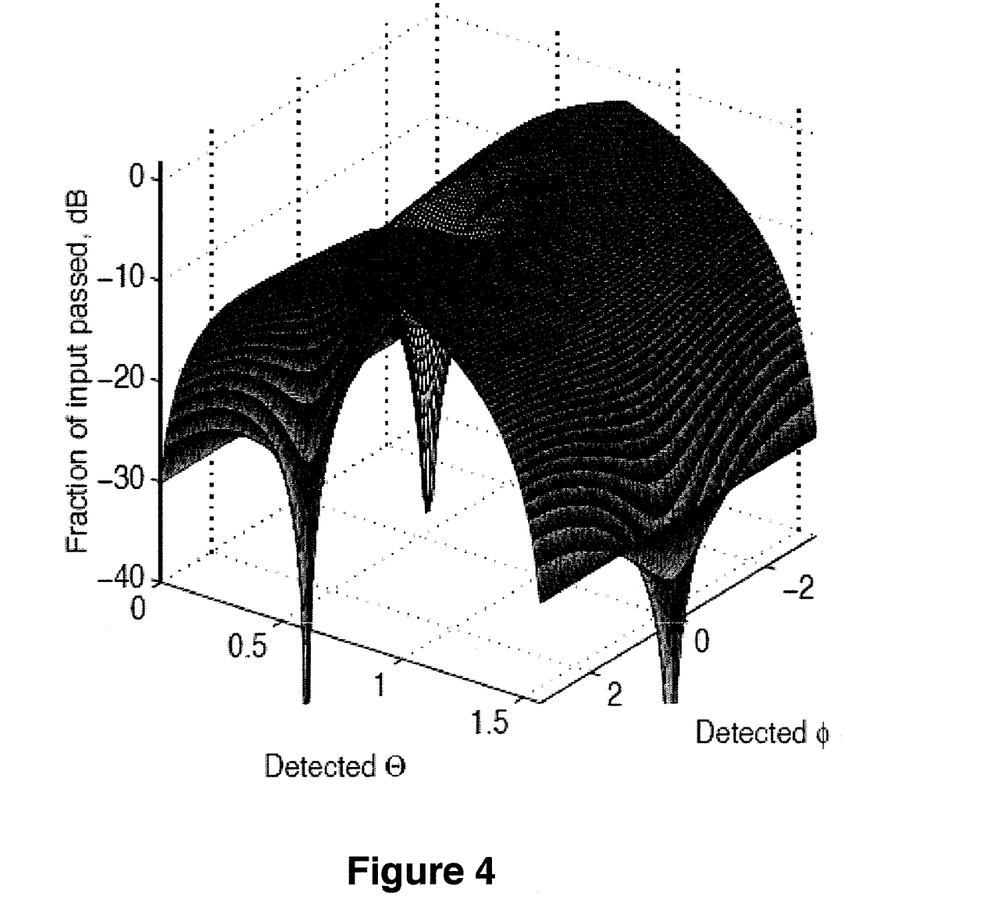
FIG. 4 shows the $f_{final}$ function for the "kill others" system according to the invention.
Figure 5:
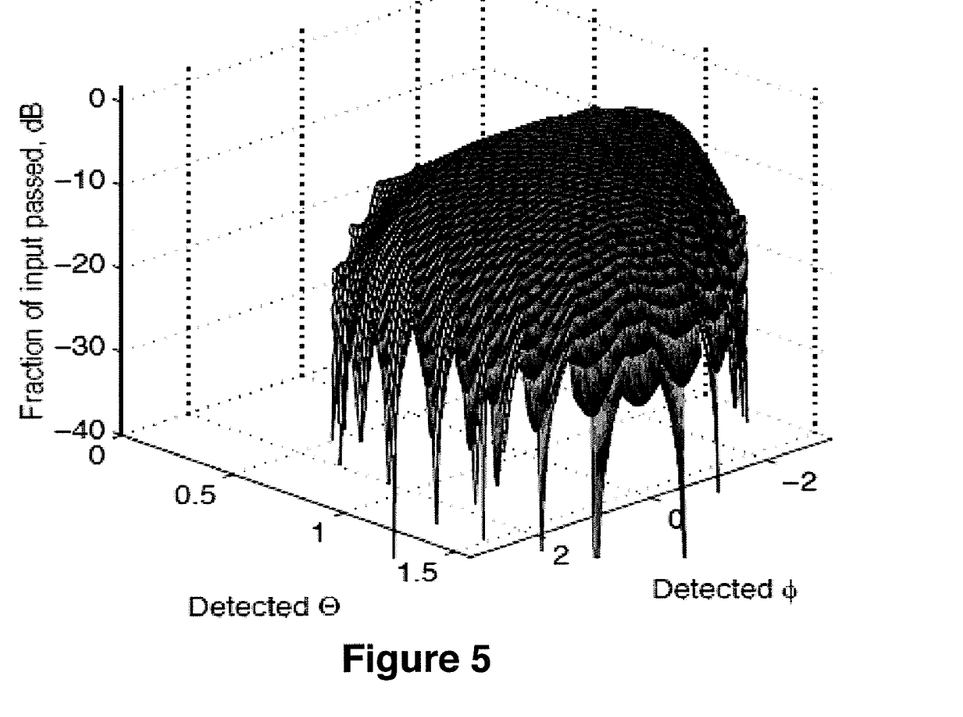
FIG. 5 shows the $f_{final}$ function for the "kill lots" system according to the invention.

A system which applies normalized weighted subtraction to all sources except the target source, by taking the minimum of the individual spatial window functions $f_i$ for each, and may be written $f_{final} = \min (f_i) \forall i \neq \text{target}$, where "target" is the source we wish to preserve. This method termed "KO" because it Kills Other sources. A corresponding $f_{final}$ for a center-right target source 3 with interferer sources 1 (strong left), 2 (center left), and 4 (strong right) is shown in FIG. 4, where the gain factor is plotted on a dB scale A system which kills as many sources as possible in an ellipse around the target source in $(\Theta, \phi)$ space. This is similar to the KO approach, but all sources on the ellipse are eliminated using corresponding $f_i$, even though they may not be present in the original mix. All points outside the ellipse receive a masking value of zero. This is called "KL" for kill lots of sources. The net effect of this method is a spatial window that isolates the source, but the functions that constitute the window each correspond to the artifact free normalized weighted subtraction algorithm. The corresponding $f_{final}$ for a target source 3 is shown in FIG. 5. Note that 28 sources on the edge of the ellipse were used to approximate the elimination of all sources on the edge of the ellipse. This was only done to save computational expense, and in practice any number of sources may be placed on the ellipse. Further, the ellipse shape may be generalized to include any arbitrary closed shape around the mixing parameters for a desired source. The important point is that all points on the border use an $f_i$ corresponding to the basic $f_i$ shape.

Figure 6:
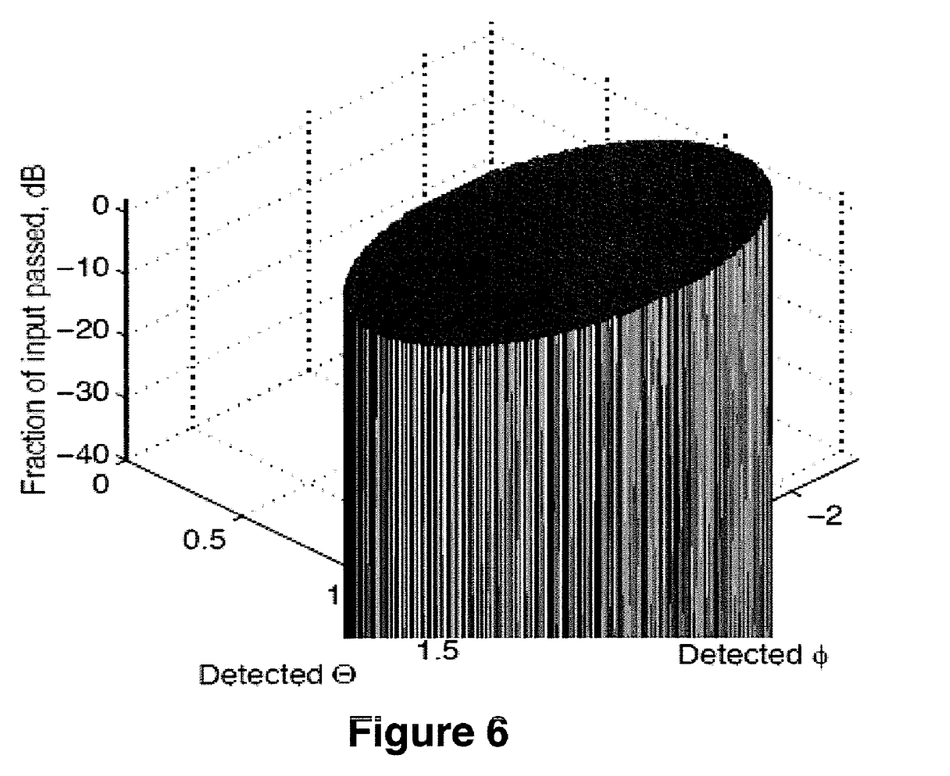
FIG. 6 shows the $f_{final}$ function for the "binary ellipse" system according to the invention.

A system the uses the same ellipse as that just mentioned, but passes all points in that ellipse at unity. This is called the binary ellipse, and is intended as a comparison with the "kill lots" system, though we also introduce it as a novel option presently. The corresponding $f_{final}$ for the example target source 3 is shown in FIG. 6.

choice of options. To eliminate a source such as source 3, for example, we choose $f_3$, using the phase for the source 3 elimination case, and no panning information. This results in an output that is identical in both channels to just using weighted subtraction.

However, by using the original input phase and/or panning information, the stereo image is enhanced greatly. We also particularly suggest the option where phase is obtained from the source elimination case, but the original panning information is retained. This gives the perceptual impression of stereo, but with almost no artifacts from the eliminated source.

The free choice of options has not been available before. We include, in Table 1 below, a list of the options required by previous systems. We also note that some systems allow $f_{final}$ to vary versus the frequency ω. That is also the case here, as the $f_{final}$ functions may be different for each frequency bin.

TABLE 1

Existing Systems: Underlying Issues

| Issue | Lindemann[1] | Rickard[2] | Avendano[3] | Weighted Subtraction (no mods) | Laroche[4] |
|---|---|---|---|---|---|
| Output Magnitude(s) | Stereo, using ⊖ | Stereo, using ⊖ | Stereo, using ⊖ | Mono | Mono |
| Output Phase(s) | Retain ∠$X_1$, ∠$X_2$ | Retain ∠$X_1$, ∠$X_2$ | Retain ∠$X_1$, ∠$X_2$ | ∠($X_1$ − ω$X_2$) | Retain ∠$X_1$, ∠$X_2$ |
| $f_i$ uses φ | Yes | Yes, iff $δ_u ≠ δ_v$ | No | Yes | Yes |
| $f_i$ varies with ω | Yes | Yes | No | No | No |
| $f_i$ function | Trig Based | Binary | Gaussian | Subtraction | Subtraction with Nonlinearity |
| Goal or Application | Enhancement (center panned only) | Isolation | Enhancement, Elimination, Re-panning | Elimination | Enhancement or Elimination |

[1] Eric Lindemann. Two microphone nonlinear frequency domain beam former for hearing aid noise reduction. In IEEE ASSP Workshop on the Applications of Signal Processing to Audio and Acoustics, pages 24-27, New Paltz, NY, USA, October 1995.
[2] Ozgur Yilmaz and Scott Rickard. Blind separation of speech mixtures via time-frequency masking. IEEE Transactions on Signal Processing, 52(7): 1830-1847, July 2004.
[3] Carlos Avendano. Frequency domain source identification and manipulation in stereo mixes for enhancement, suppression, and re-panning applications. In IEEE ASSP Workshop on the Applications of Signal Processing to Audio and Acoustics, pages 55-58, New Paltz, NY, USA, October 2003.
[4] Jean Laroche. Process for removing voice from stereo recordings, U.S. Pat. No. 6,405,163, June 2002.

Figure 7:
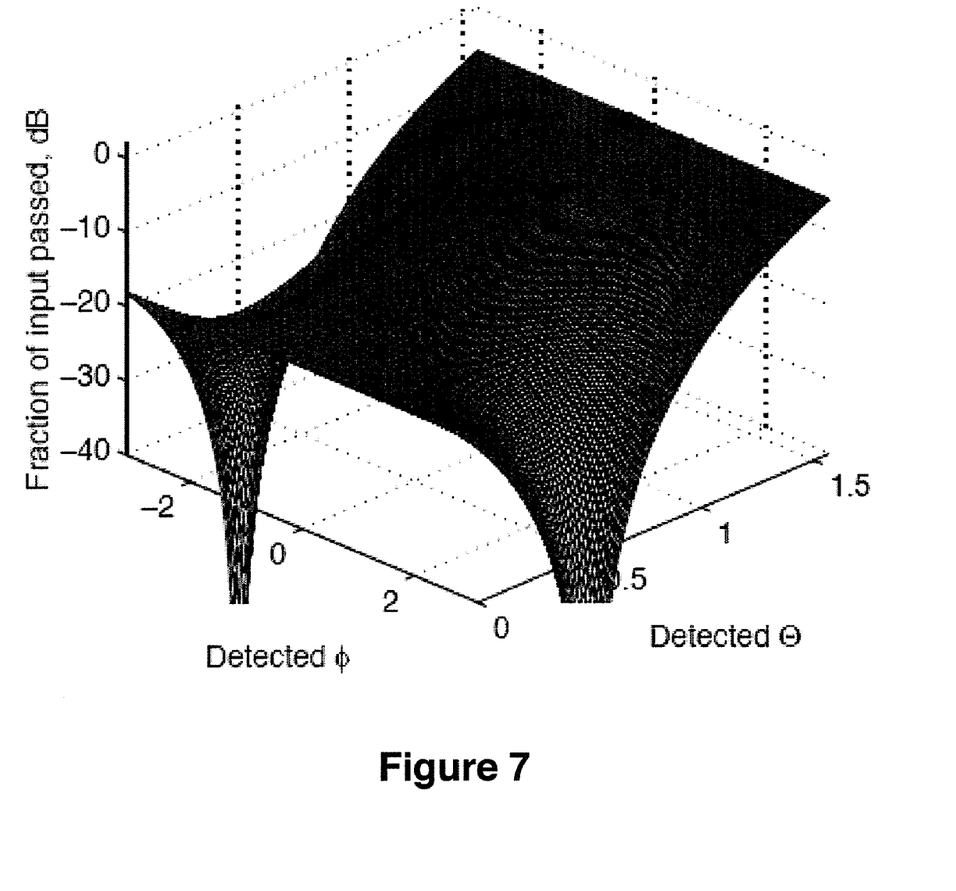
FIG. 7 shows the $f_{final}$ function for the "inverse" system according to the invention.

A system that simply uses $f_{final}=(1−f_i)$ as the spatial window, where $f_i$ is the masking function to eliminate the target source using normalized weighted subtraction. We call this the "inverse" system and the corresponding $f_{final}$ for the example target source 3 is shown in FIG. 7.

As suggested just above, we may also use various phase in the spectrogram before we invert it to obtain the time domain output.

The options include at least:
Use the original detected input phase in the output for each channel.
Use the phase that resulted from any of the elimination of any source using $Y_n$.
Use an interpolation between the two.

Finally, we may also use the original panning of the input sources by multiplying the U value by cos(Θ) in the left channel and sin(Θ) in the right channel. Or, we may simply use U·$f_i$ for both channels, effectively eliminating panning information.

If the objective in the system is source elimination without artifacts, we note that this can be done with the weighted subtraction algorithm. This can, in fact, be done by careful Training Above, we described a system that uses functions $f_i$ to choose a gain factor for each input STFT point for each source. We now describe an embodiment in which we allow the system to obtain $f_i$ based on training data. A key aspect of this embodiment of the invention is that input data points that appear to be coming from the direction of one source are assigned to that source, with a lesser fraction of the energy assigned as the input data point's direction varies from that of the source. As will be discussed below, the decision about how much energy to allocate is informed by a separately conducted training process in which the system learns to make optimal decisions. As commented above, it is not true in 100% of cases that a lesser fraction of the energy assigned as the input data point's direction varies from that of the sources. This is an intuitive way to describe what generally happens as a result of the training. A general step-by-step approach is as follows.

1. Take a stereo audio signal as input, and load training data into memory.
2. Perform a spectrogram decomposition on each channel of the input, thus obtaining both the magnitude and phase for each point (frame t and frequency ω). Call the left and right channel spectrograms $X_1(\omega, t)$ and $X_2(\omega, t)$ respectively.

3. Estimate the panning parameter $\hat{\Theta}=\arctan(|X_2/X_1|)$ at each spectrogram point and the phase offset between channels as $$\phi = \angle\left(\frac{X_1}{X_2}\right).$$

Using these data, estimate the mixing parameters for all sources using any variety of techniques known to those skilled in the art. The mixing parameters may also be specified by the user.

4. Based on the mixing parameters and on the detected $\hat{\Theta}$ and detected $\phi$, the loudness of the input, and the frequency band in question, assign some fraction of the energy in each input spectrogram point to each source i. The loudness is defined as $U=\sqrt{|X_1|^2+|X_2|^2}$ and the frequency band is determined by which spectrogram bin is in question. We have found double-width Bark bands to be a good size for frequency bands, although other groupings such as octaves may also be used.

5. For each spectrogram, use either the original input phase, or a special phase function described above, obtained from taking a weighted subtraction of one input channel from the other. Also, re-pan sources using their original panning data, or make a both spectrogram magnitudes the same. Both of these steps were described above.

6. Now there are two output spectrograms for each source, for a total of 2N.

7. Invert the spectrograms to obtain the final output of N time domain stereo source signal estimates.

Allocation of Input Energy

The fourth step above is a key aspect of the novel system, the step that substantially defines the output. It is also the step that has been implemented in very different ways in different systems, and we presently explore it in more depth. Because the spatial window assigns a fraction of the energy in a spectrogram point to a source based on the panning parameter estimate $\hat{\Theta}$, phase estimate $\phi$, and loudness U, we may think of it as multiplying the input spectrograms by a masking function which is a function of $\hat{\Theta}$ and $\phi$. Now, there are N sources, each with such a function, so we may notate the window for the $i^{th}$ source as $f_i(\hat{\Theta}, \phi, U)$. The functions may also vary with frequency band F, so we may actually write $f_i(F, \hat{\Theta}, \phi, U)$. Some systems have excluded phase offset information. However, it is desirable for $f_i$ to include $\phi$ information because it has been shown that phase information may indicate which sources are sounding most loudly (see, for example, Aaron S. Master. *Stereo Music Source Separation via Bayesian Modeling*. Ph.D. Dissertation Stanford University (2006) available from http://www-ccrma.stanford.edu/~asmaster/). This system also pioneers the use of loudness information and frequency band information. These measures are useful because some sources are louder at various frequencies or are louder in general, and this leads to differences in detected loudness over various frequencies, or in general, when the sources are mixed. For example, the drums might be the loudest source in general, so ambiguous loud input should be assumed to be drums. At low frequencies, an electric bass might be louder than other instruments or voices, so loud data at low frequencies likely belongs to the electric bass. These differences can and should be exploited by a demixing system.

A flowchart for a typical demixing system is shown in FIG. 1, in which the large multiplication symbol or flowchart "summing junction symbol" implies multiplying each of the two inputs on the left by each of the N spatial window function value entering from above, generating 2N outputs. Such stereo output is not the only type of output that may be produced by spatial windowing systems. Other examples include, for example:

Just using the channel in which the targeted source is louder while ignoring the other one (see, for example, Nicoleta Roman, DeLiang Wang, and Guy J. Brown, *Speech segregation based on sound localization*, Journal of the Acoustical Society of America, 114(4):2236-2252 (October 2003));

Combining both output channels into a single source estimate (see, for example, Ozgur Yilmaz and Scott Rickard, *Blind separation of speech mixtures via time-frequency masking*, IEEE Transactions on Signal Processing, 52(7):1830-1847 (July 20043)); or Re-panning the output to be located in the center (see, for example, J-K Lin, D. G. Grier, and J. D. Cowan, *Feature extraction approach to blind source separation*, IEEE Workshop on Neural Networks for Signal Processing (NNSP), pages 398-405, Amelia Island Plantation, Fla., USA (September 1997)).

It is also useful, for purposes of explaining the current system, to think of the input in terms of the loudness $U=\sqrt{|X_1|^2+|X_2|^2}$ as mentioned above (see Equations (1)-(4) above).

We represent each spectrogram sample, then, in terms of its power, U, the detected panning parameter $\hat{\Theta}$, the phase in the left channel $\angle X_1$, and the phase offset between channels, $\phi$. Given such a representation, we may see the $f_i$ as a simple scalar multiple applied to U, based on the values of $\phi$, $\hat{\Theta}$, and U, with all other information in the input signal preserved. Such an interpretation is shown in FIG. 2, which also considers only one particular spatial window i, instead of N of them. Note that this plot does not show that $f_i$'s dependence on U or the frequency band F. This conceptualization is used in the current system, as we express the output in terms of the $f_i$ for each source multiplied by U.

Training Algorithm

We noted above that the system uses training data to inform its $f_i$ functions.

The training process operates as follows:

1. Begin with some training information about each source signal, which may include either similar time domain signals or frequency domain characteristics in terms of magnitude versus various frequency bands. It must also include the mixing parameters of the sources which, as mentioned above, can either be estimated using techniques known in the art or as specified by the user.

2. Convert non-spectrogram-domain training data to the spectrogram domain. To obtain spectrogram data from frequency band loudness information, copy all magnitudes of a frequency band to its corresponding bins and bring in random phase. To ensure that the data generalizes, add a sufficient number of randomized phase samples to either type of data. This may be done by copying the magnitude information and bringing in uniformly sampled phase information.

3. Do a mixing and detection procedure for every frequency band and every possible combination of sources. For example, if three sources are present, the combinations are source one only; source two only; source three only;

sources one and two only; sources one and three only; sources two and three only; and sources one, two, and three.

(a) Mix the data in the spectrogram domain using the specified mixing parameters for each source present. There is likely no need to time-align sources, such as for sources playing together on the beat, because a quick check of some example training data showed that doing so had little effect.

(b) Estimate $\Theta$, $\phi$, and U for each training point as mentioned above. Also, record the relative strength of each source used in each of those training points.

(c) Set up a three-dimensional histogram which chops up each of the $\Theta$, $\phi$, and U spaces into bins. We found that 40, 13, and 12 bins were reasonable divisions of the respective parameters, though other values are possible. This leads to a histogram with a total of 40*13*12=6240 bins.

(d) Go through every one of the 6240 bins and, for each, find and record the number of training points that fall inside. These values are recorded in an array called "bighist." Recalling that we also recorded the relative strength of each source for each training point, also record the median relative value of each source that falls inside. The median is a way of avoiding recording the distribution on all sources, which leads to an unmanageable data explosion, at least with current computation. A full distribution could also be recorded with very slow performance. Spot checking of data revealed that source data were generally concentrated in unimodal clusters well-represented by a median. If no training points fall inside, set the relative contribution of the sources there to zero. These value are recorded in an array called "sourcedata."

4. We now have, for each point in the 3-D histogram, the popularity of each combination there, as well as the median source value of each source in the combination. We may now use this information either to estimate the "most likely" (ML) median source values for a given histogram bin, or the "expected median value" (EMV) of the sources for the bin. We describe both. For each histogram bin, do the following:

To obtain the ML estimate, find the combination that was most popular in the histogram bin. It has the largest value of any combination in "bighist" for this histogram bin. Record the median values of the sources for that combination in the histogram bin from "sourcedata" as the ML estimate for the bin.

To obtain the EMV estimate, take an average of the median source values in each combination recorded in the histogram bin from "sourcedata", weighted by the popularity of the combination in that histogram bin as recorded in "bighist."

5. Now, for every bin of a 3-D histogram, we have estimates of the most likely median source value and the expected median source value of each source. We may represent these as fractions of the detected loudness, giving us the originally sought $f_i$.

6. These estimates are actually 4-D because they exist for each frequency band. Because of data sparseness, we may smooth the data across all four dimensions. We used a Hann window of length five to do this, although other windows and lengths are possible.

Figure 8:
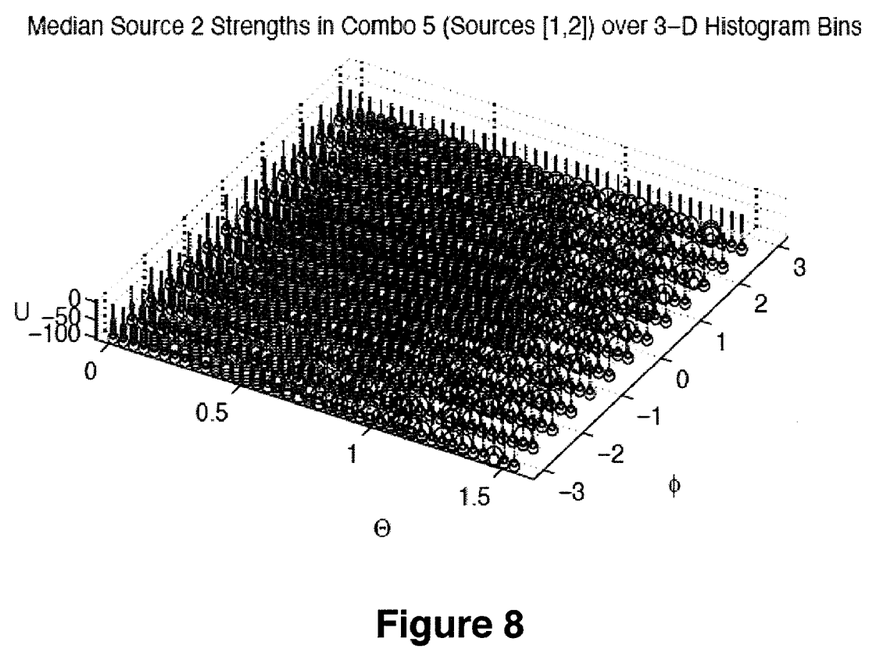
FIG. 8 shows source 2 relative strength in combination number 5 (which contains sources 1 and 2) in frequency band 6 according to the invention.

We include an example of "sourcedata" in FIG. 8. It shows the median relative value of an example source two in frequency band 6, when it is in "combination 5" which includes sources one and two. We observe that the data are plotted over the three mentioned variables of the histogram. Because of this, we must show the relative magnitude of the source 2 by using larger circles to represent louder values. If the circle is the largest value shown, then the relative contribution of the source 2 to the detected loudness U is near 100%.

When new input is given to the system, the system can use the training data as follows:

1. Perform a spectrogram decomposition of the input.
2. For each point in the spectrogram:
(a) Estimate the $\Theta$, $\phi$, and U triplet;
(b) For each such triplet, find its corresponding histogram bin; and
(c) Recalling that each histogram bin has an associated ML or MEV set of median source estimates, multiply the detected U by the desired estimates' corresponding $f_i$. There are as many estimates as sources.
3. We now have a spectrogram for each source. Re-apply panning information if desired, use the original input's phase or a special phase function resulting from a subtracting a weighted version of X1 from a weighted version of X2, and invert the spectrograms to obtain time-domain signals.

Although the invention is described herein with reference to the preferred embodiment, one skilled in the art will readily appreciate that other applications may be substituted for those set forth herein without departing from the spirit and scope of the present invention. For example, any standard (known) audio filter may be used before or after the herein disclosed separation system. Audio filters may be used in conjunction with the invention herein, for example, to make some frequency ranges louder (emphasis) or quieter (de-emphasis).

While the invention is described herein in connection with voice and music, it will be appreciated by those skilled in the art that the invention may be used in any application involving an audio signal controlling more than one source of sound. For example:

karaoke;

extracting main melody voice or instrument signals, transcribing a result in musical notes, and then using that recorded melody to facilitate melody-following, to form a searchable database of melodies, or to query such a database;

extracting main melody voice or instrument signals, and then transcribing a result in words, to facilitate lyrics-following, or lyrics-recognition;

extracting main melody voice, and then using a result for automatic singer voiceprint identification;

extracting main melody voice or instrument signals, and then using a result as input to a voice- or instrument-type recognition system;

coding extracted voices or instruments more efficiently using high-efficiency source-specific coders; and extracting individual voices or other sound sources from an audio track that accompanies a film or video presentation, for example, to enhance or replace a particular actor's dialog or to enhance or replace sound effects or music.

Accordingly, the invention should only be limited by the Claims included below.

The invention claimed is:

1. A method for separation of at least two sources in an audio signal, comprising the steps of:

inputting a two-channel audio signal mixture;

performing an STFT decomposition of each of said channels, comprising an FFT for each overlapping time frame, to form left and right complex-valued spectrograms $X_1(\omega, t)$ and $X_2(\omega, t)$;

estimating a panning parameter at each spectrogram point and a phase offset between channels, where the phase offset may be converted to a delay estimate;

estimating mixing parameters for all sources based upon said estimated panning parameters and said phase offset;

given mixing parameters for each source and frequency band activity for each source, demixing said sources by creating masks from spatial window functions in a parameter space including detected panning and detected phase offset;

based on a detected panning and phase for each spectrogram point and said mixing parameters, assigning some fraction of the energy in said spectrogram point to each source;

for each spectrogram, employing a phase function using either an original input phase, or a phase that results when normalized weighted and delayed subtraction is performed, to eliminate any source existing in said audio signal;

producing two output spectrograms for each source, wherein 2N spectrograms result; and inverting said output spectrograms and providing a final output of N time domain stereo source signal estimates.

2. The method of claim 1, further comprising the step of: obtaining said fraction by performing normalized weighted and delayed subtraction of one channel from another.

3. The method of claim 1, further comprising the step of: raising said fraction to an arbitrary power to create more attenuation.

4. The method of claim 1, further comprising the step of: using a minimum of several fractions as a final fraction.

5. The method of claim 4, wherein said several fractions correspond to fractions used to eliminate each of one or more other sources in said input.

6. The method of claim 4, wherein said several fractions correspond to sources with arbitrary mixing parameters, so long as said parameters are in a closed shape around a target source's mixing parameters.

7. The method of claim 6, wherein said closed shape is an ellipse in a panning and phase (or delay) parameter space.

8. The method of claim 1, further comprising the step of: performing a linear interpolation between said two phase functions.

9. The method of claim 1, further comprising the step of: re-panning said sources using their original panning data.

10. The method of claim 1, further comprising the step of: making both said $X_1(\omega, t)$ and $X_2(\omega, t)$ spectrogram magnitudes the same by multiplying a combined magnitude said input audio signal by a final fraction.

11. The method of claim 1, wherein said input is any of music and speech.

12. A method for separation of at least two audio sources, comprising the steps of:

inputting a two-channel audio signal mixture;

performing an STFT decomposition of each of said channels, comprising an FFT for each overlapping time frame, to form left and right spectrograms $X_1(\omega, t)$ and $X_2(\omega, t)$;

estimating panning, phase offset, and loudness parameters for each spectrogram point;

given the estimated parameters and frequency band of each input point, finding a corresponding bin in a histogram of most likely and expected median source values;

assigning spectrogram energy to said sources by multiplying a fraction of input corresponding to a most likely or median source value from a corresponding histogram bin;

using original phase data or that from a special phase function created when subtracting a weighted version of said left spectrogram $X_1(\omega, t)$ from a weighted version of said right spectrogram $X_2(\omega, t)$, or an interpolation between these two values; and inverting each source estimate spectrogram to obtain time domain source signal estimates.

13. The method of claim 12, further comprising the step of: re-panning the said source estimates using the original input spectrogram panning data.

14. The method of claim 12, further comprising the step of: making both spectrogram magnitudes the same.

15. The method of claim 12, wherein said input comprises any of music and speech.

* * * * *